(12) United States Patent
Blum et al.

(10) Patent No.: US 12,251,992 B2
(45) Date of Patent: Mar. 18, 2025

(54) HINGED PANEL LOCKING ASSEMBLY

(71) Applicant: Nivel Parts & Manufacturing Co., LLC, Jacksonville, FL (US)

(72) Inventors: David Edward Blum, Raleigh, NC (US); Stephen Michael Page, Fuquay Varina, NC (US)

(73) Assignee: NIVEL PARTS & MANUFACTURING CO., LLC, Jacksonville, FL (US)

( * ) Notice: Subject to any disclaimer, the term of this patent is extended or adjusted under 35 U.S.C. 154(b) by 232 days.

(21) Appl. No.: 17/940,307

(22) Filed: Sep. 8, 2022

(65) Prior Publication Data

US 2023/0073030 A1 Mar. 9, 2023

Related U.S. Application Data

(60) Provisional application No. 63/241,587, filed on Sep. 8, 2021.

(51) Int. Cl.
| | |
|---|---|
| *B60J 1/06* | (2006.01) |
| *B60J 1/18* | (2006.01) |
| *E05C 3/00* | (2006.01) |
| *E05C 3/04* | (2006.01) |

(52) U.S. Cl.
CPC ............... *B60J 1/1884* (2013.01); *B60J 1/06* (2013.01); *E05C 3/004* (2013.01); *E05C 3/046* (2013.01)

(58) Field of Classification Search
CPC ......... B60J 1/02; B60J 1/04; B60J 1/06; B60J 1/006; B60J 1/1884; E05C 1/10; E05C 3/145; E05C 3/004; E05C 3/041; E05C 3/046; E05C 7/06; E05Y 2900/55
USPC .................................. 296/77.1, 84.1, 96.21
See application file for complete search history.

(56) References Cited

U.S. PATENT DOCUMENTS

| | | | | |
|---|---|---|---|---|
| 7,665,775 | B1* | 2/2010 | Miller | E05B 65/0841 |
| | | | | 292/DIG. 20 |
| 11,305,619 | B1* | 4/2022 | Vanover | B60J 10/72 |
| 2009/0229094 | A1* | 9/2009 | Reese | B60J 1/06 |
| | | | | 296/96.2 |
| 2011/0271720 | A1* | 11/2011 | Zheng | E05C 3/046 |
| | | | | 70/89 |
| 2016/0318376 | A1* | 11/2016 | Martin | B60J 1/006 |
| 2017/0218990 | A1* | 8/2017 | Gonnet | B60J 1/005 |
| 2020/0047594 | A1* | 2/2020 | Gulledge | B60J 1/006 |

(Continued)

Primary Examiner — Gregory A Blankenship
(74) Attorney, Agent, or Firm — COATS & BENNETT, PLLC

(57) ABSTRACT

A locking assembly for locking panels of a hinged panel assembly together. The hinged panel assembly has a second movable panel rotatably mounted to a first fixed panel by a hinge. The locking assembly is intended for selectively holding the second panel in position relative to the first panel in a folded configuration. The locking assembly includes a male assembly and a female assembly. The male assembly is configured to be rotatably mounted to the first panel, and has a tab rotationally fixed relative to a rotatable actuator, with the tab and the actuator configured to be disposed on opposing sides of the first panel. The female assembly is configured to be fixedly mounted to the second panel. The female assembly has a recess configured to receive the tab. The locking assembly is rotatable between a locked position and an unlocked position.

20 Claims, 11 Drawing Sheets

(56) References Cited

U.S. PATENT DOCUMENTS

2022/0274467 A1* 9/2022 Meda ..................... B60J 1/007
2023/0073030 A1* 3/2023 Blum ..................... B60J 1/1884

* cited by examiner

HINGED PANEL LOCKING ASSEMBLY

RELATED APPLICATIONS

The present application claims benefit of U.S. Provisional Application No. 63/241,587, filed Sep. 8, 2021, the disclosure of which is incorporated herein by reference in its entirety.

TECHNICAL FIELD

The present disclosure relates generally to a hinged panel locking assembly such as may be used with front or rear windshields of utility task vehicles, and related panel assemblies and utility task vehicles.

BACKGROUND

A utility task vehicle ("UTV", also known as a utility terrain vehicle, or generically a utility vehicle) typically has a front and/or rear windshield that serves to protect occupants from wind, rain, and debris. The cabin of the UTV is generally closed by the windshield. Many such windshields are of a hinged design, which allows one panel of the hinged windshield to be folded down/up to "open" the windshield. However, because UTV's are frequently driven over rough terrain, the folded down/up windshield panel may bounce, which may generate undesirable noise, visual disturbances, and/or damage. Accordingly, some folding windshields are provided with retention mechanisms, such a rubber grips located at the lateral edges, that are used to secure the folding panel portion when in the folded position. Such retention mechanisms have not always proven reliable, and may be inconvenient to use.

Thus, there remains a need for alternative approaches to securing hinged panels for UTVs in the folded position, advantageously approaches that allow for easy installation and/or are reliable.

SUMMARY

The present disclosure relates to a locking assembly for locking panels of a hinged panel assembly together. The hinged panel assembly has a second movable panel rotatably mounted to a first fixed panel by a hinge, such that the hinged panel assembly is movable between a deployed configuration and a folded configuration. The locking assembly is intended for selectively holding the second panel in position relative to the first panel in the folded configuration. The locking assembly includes a male assembly and a female assembly. The male assembly is configured to be rotatably mounted to the first panel. The male assembly has a tab rotationally fixed relative to a rotatable actuator, with the tab and the actuator configured to be disposed on opposing sides of the first panel. The female assembly is configured to be fixedly mounted to the second panel. The female assembly has a recess configured to receive the tab. The locking assembly is rotatable between a locked position and an unlocked position, while the folding panel assembly is in the folded configuration, by rotation of the actuator. In the locked position, the tab extends into the recess and is captured between the female assembly and the second panel so as to hold the second panel relative to the first panel. In the unlocked position, the tab is outside the recess so as to allow the second panel to rotate relative to the first panel about the hinge. Rotation of the actuator causes rotation of the tab to change the locking assembly between the locked position and the unlocked position. The male assembly may include a first section coupled to a second section via a fastener, with the first section configured to be disposed mostly on a first side of the first panel and having the actuator, and with the second section configured to be disposed mostly on a second side of the first panel and having the tab.

Related methods and assemblies, such as a combination of a locking assembly and a corresponding folding panel assembly (e.g., folding windshield), and related vehicles, are also disclosed. Accordingly, and of the embodiments of the locking assembly described herein may be mounted on a windshield to form a windshield assembly. Thus, the locking assembly may be a stand-alone product, or may be part of a combined product with a windshield, either as a kit or pre-assembled.

The features, functions and advantages that have been discussed above, and/or are discussed below, can be achieved independently in various aspects or may be combined in yet other aspects, further details of which can be appreciated with reference to the following description and the drawings.

DETAILED DESCRIPTION

Figure 1:
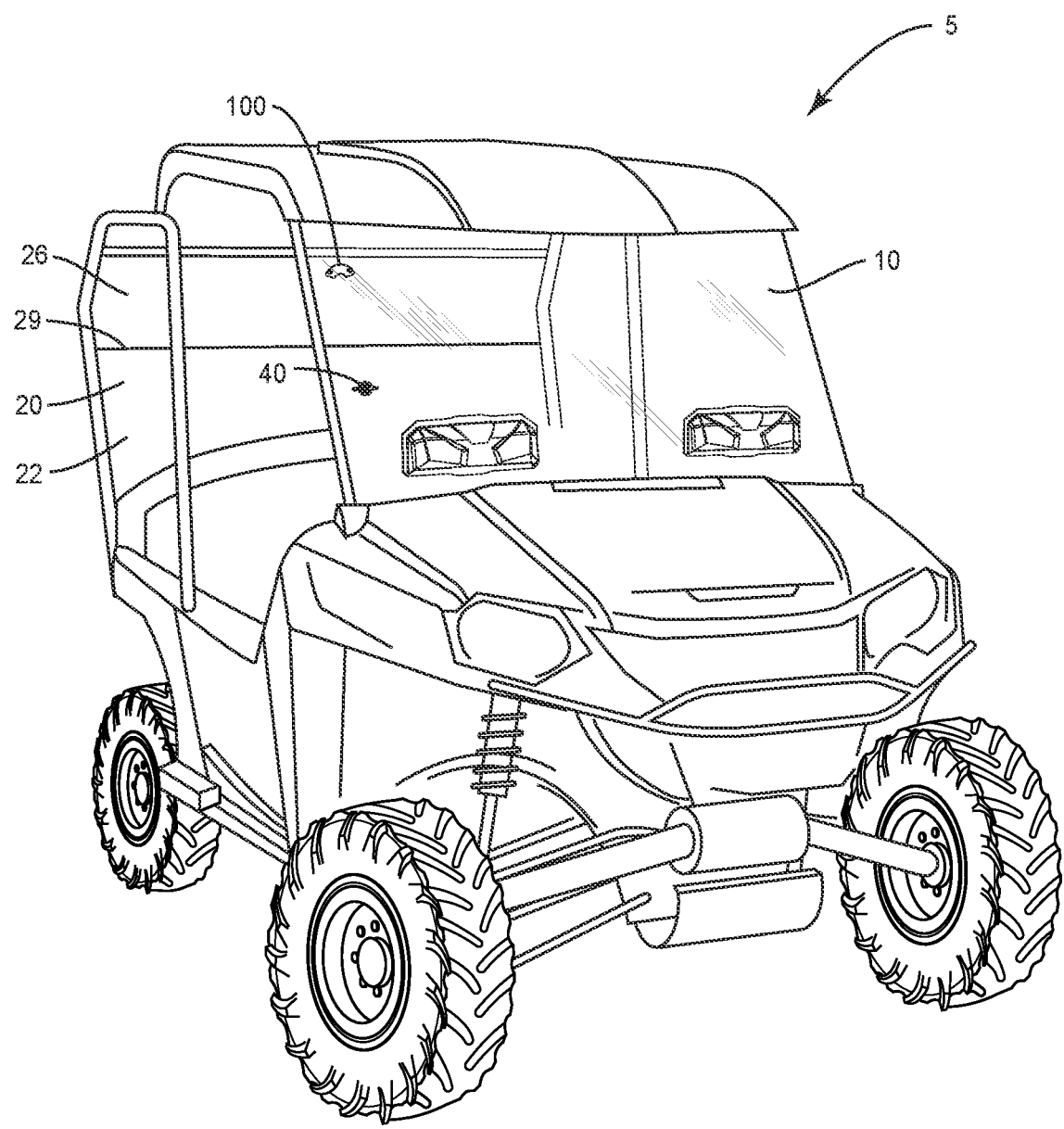
FIG. 1 shows an exemplary UTV with a locking assembly according to one or more embodiments.

Referring now to the drawings, FIG. 1 shows an exemplary UTV 5 having a front windshield 10 and a rear windshield 20. The rear windshield 20 has two sections or panels 22, 26 that are hinged together so that the upper panel 26 of rear windshield 20 can fold down when desired. Also shown, and discussed further below, is a locking assembly 30 mounted to the rear windshield 20. Note that the details of the UTV 5, other than the locking assembly or assemblies 30, are illustrative only, and the UTV 5 can take any form known in the art. For example, the UTV 5 may have a fully or partially enclosed cabin; may accommodate two, four, or six, or some other number of occupants; may have a rear cargo bed or not; may be gas, diesel, and/or electrically powered, etc.

Figure 2:
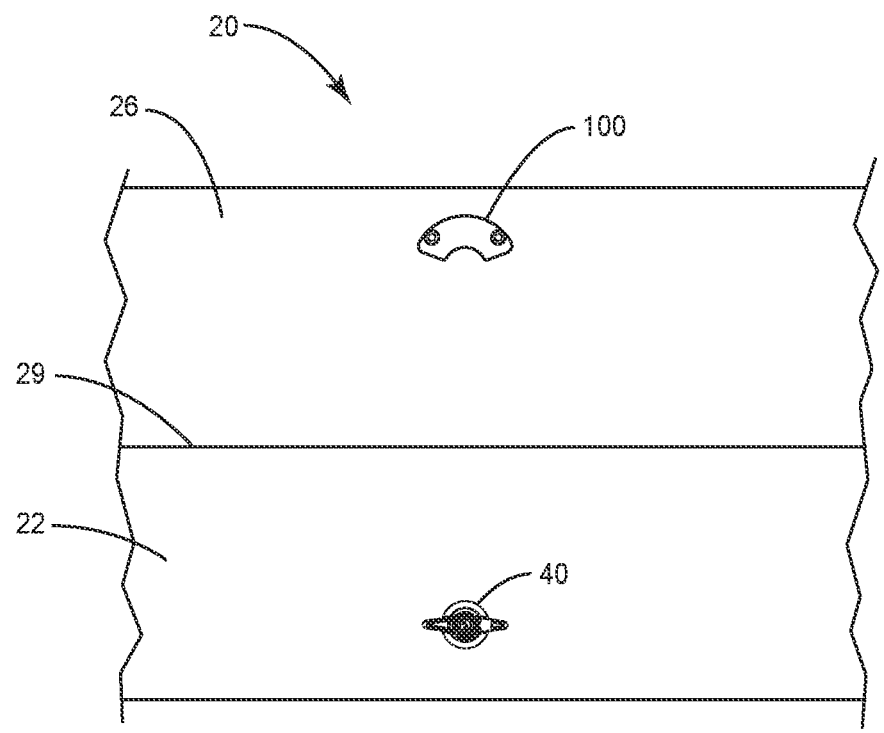
FIG. 2 shows a rear view of the rear windshield of the UTV of FIG. 1 with a locking assembly mounted thereto, and with the second panel in the up/deployed position.
Figure 2A:
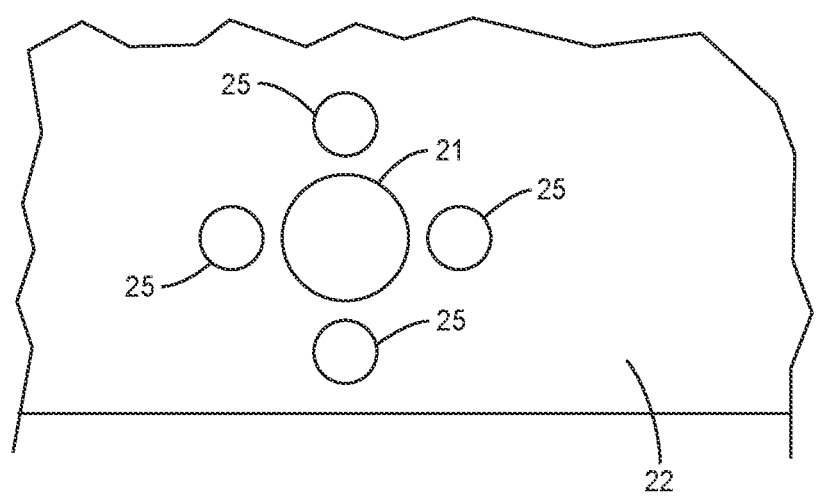
FIG. 2A shows a partial detail of the first panel of the rear windshield of FIG. 2, with the locking assembly omitted.

The present invention relates to a hinged panel locking assembly 30, and related panel assemblies and vehicles. For simplicity, the hinged panel locking assembly 30 may be discussed below in the context of front and/or rear windshields for a UTV. Thus, for illustrative purposes, FIG. 2 shows the locking assembly 30 mounted to the rear windshield 20, which is of a folding type with a first panel 22 hingedly connected to a second panel 26 by a hinge 29. Further, it will be assumed that the second panel 26 is above the first panel 22, and is foldable, while the first panel 22 is fixed in place relative to the UTV 5. Thus, the second panel 26 can be folded down by rotating "out" and down about the hinge 29, to mostly overlay the first panel 22. Thus, the second panel 26 has at least two positions, an up or deployed position, and a down or folded position.

The locking assembly 30 functions to secure the second panel 26 of the windshield 20 relative to the first panel 22 when the second panel 26 is in the folded position. The locking assembly 30 includes a male assembly 40 that is mounted to the first panel 22, and a female assembly 100 that is mounted to the second panel 26. When the second panel 26 is folded down, the male assembly 40 is aligned with the female assembly 100, and the male assembly 40 can be rotated so that a tab 80 of the male assembly 40 is captured between the female assembly 100 and the second panel 26. In this fashion, the second panel 26 is held in position relative to the first panel 22, and bouncing of the second panel 26 is inhibited.

Figure 3:
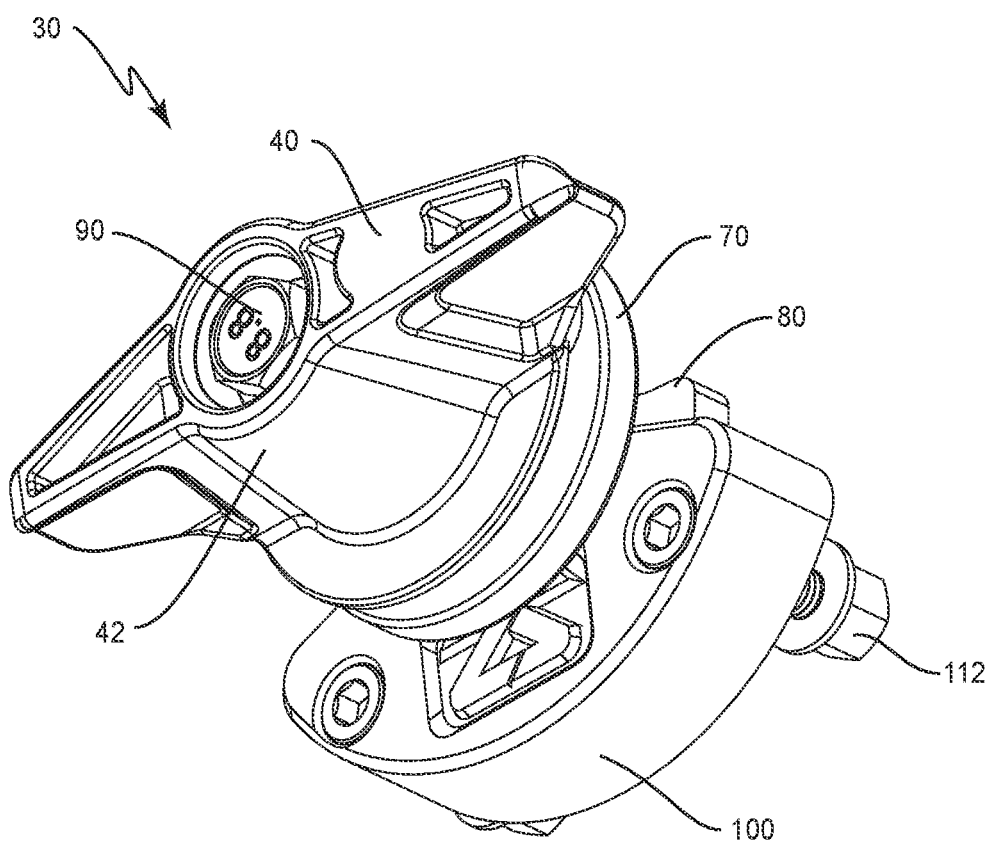
FIG. 3 shows perspective view of a locking assembly.
Figure 4:
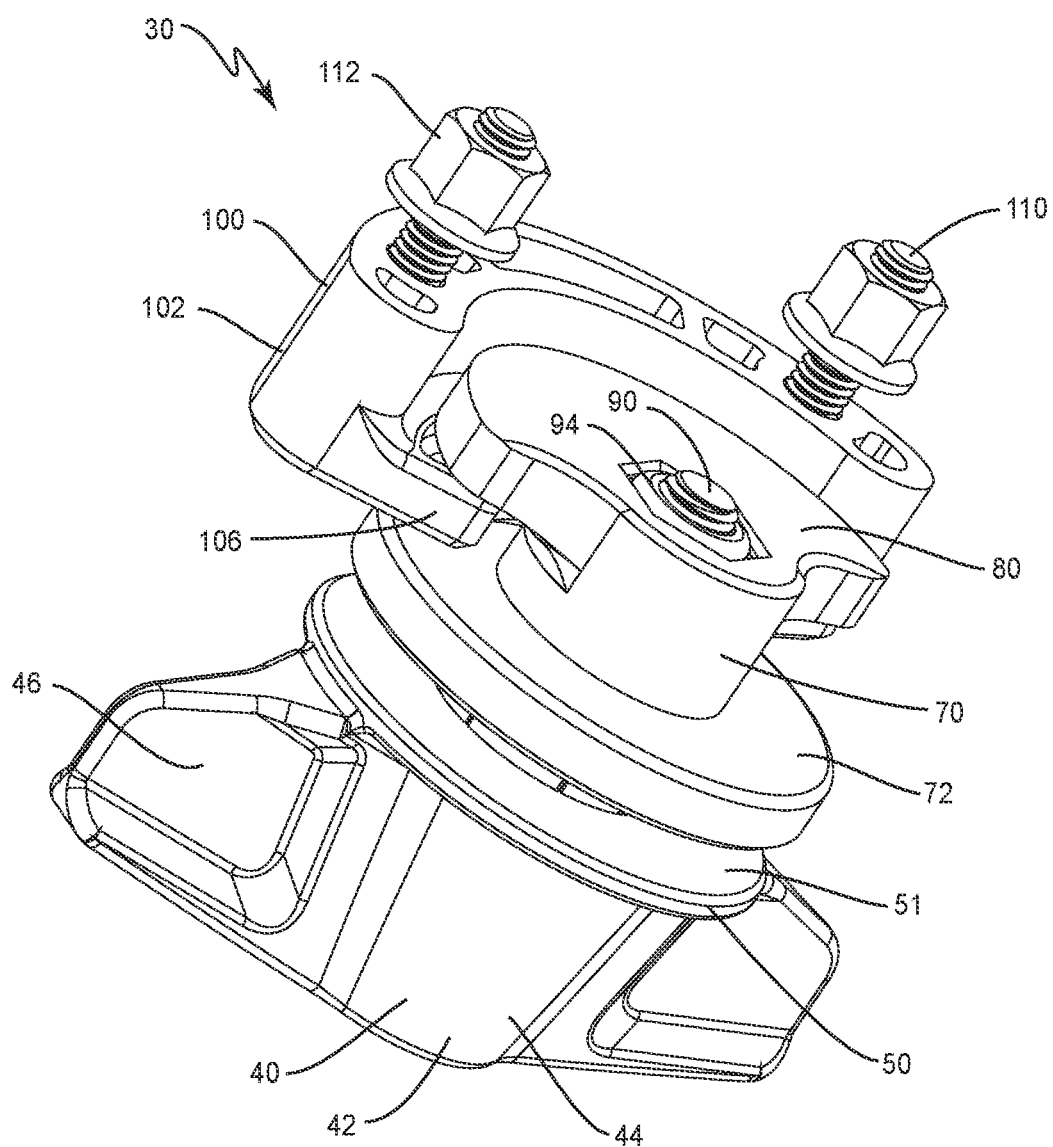
FIG. 4 shows an perspective view of the locking assembly of FIG. 3.
Figure 5:
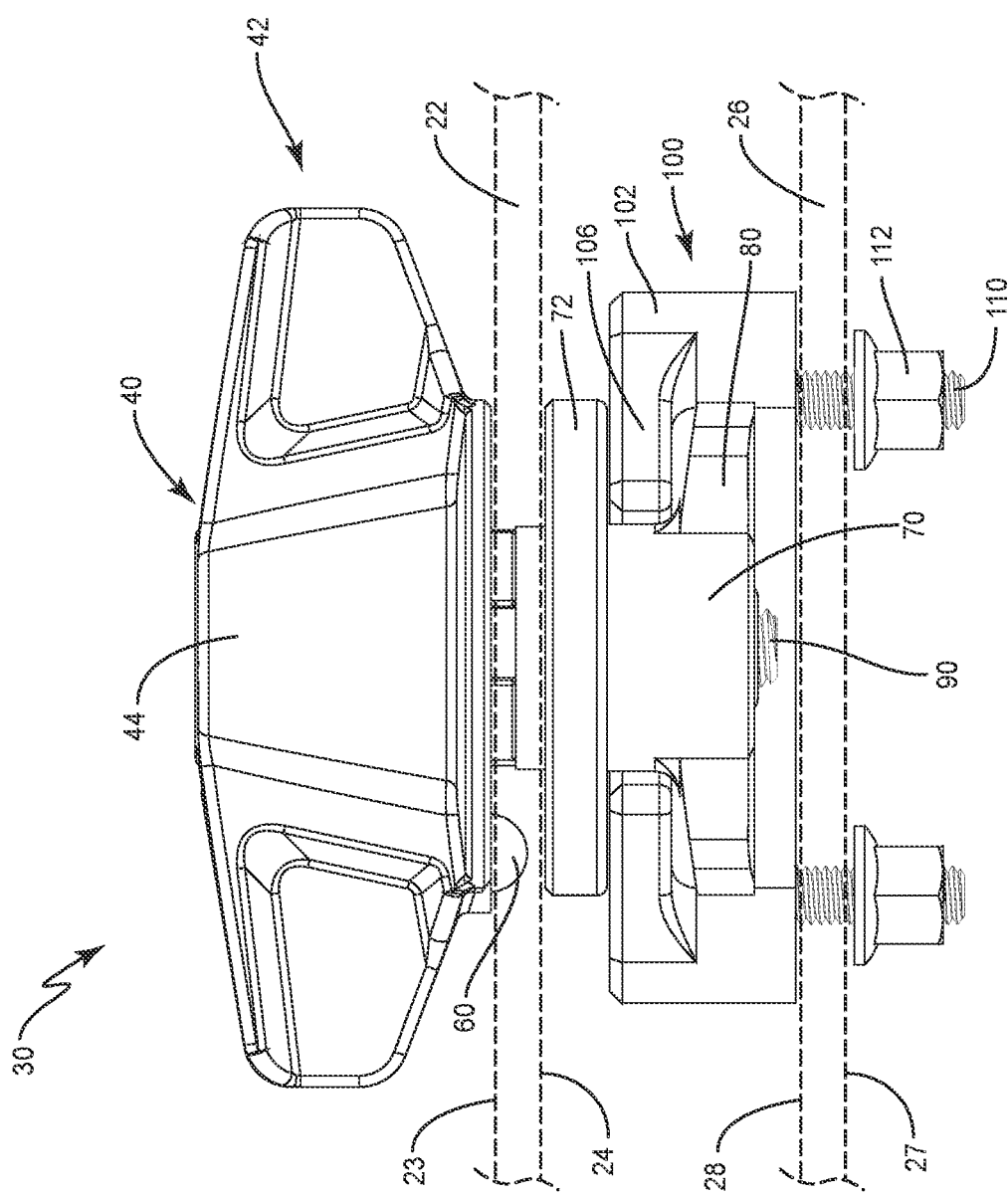
FIG. 5 shows a top view of the locking assembly of FIG. 3, with dashed lines showing panels of the corresponding windshield in the folded position.
Figure 6:
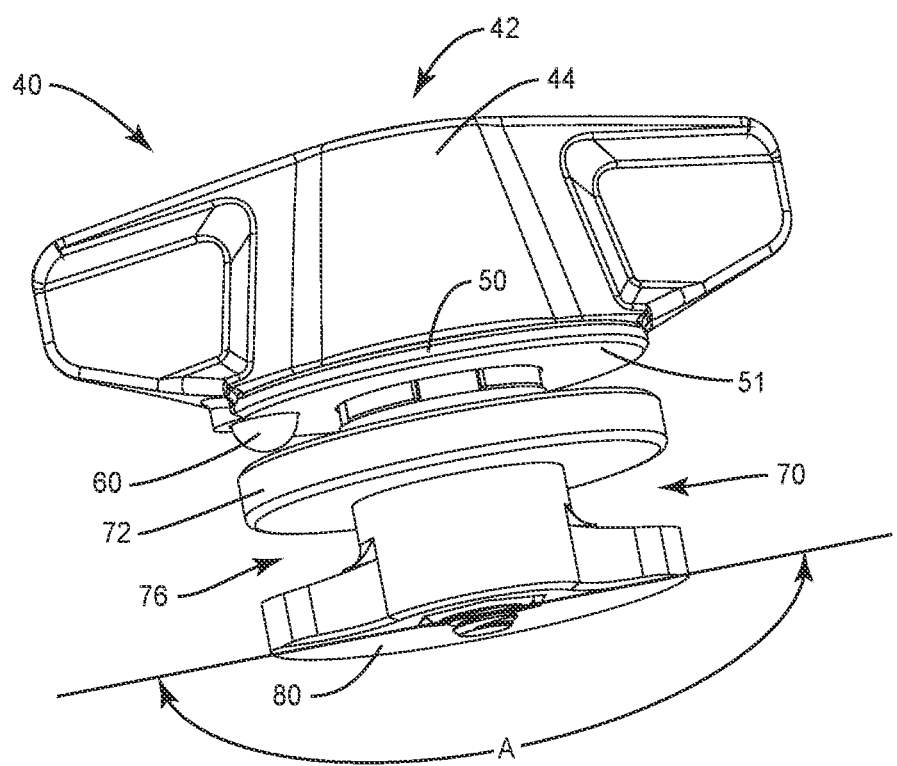
FIG. 6 shows a perspective view of the male assembly of the locking assembly of FIG. 3.
Figure 7:
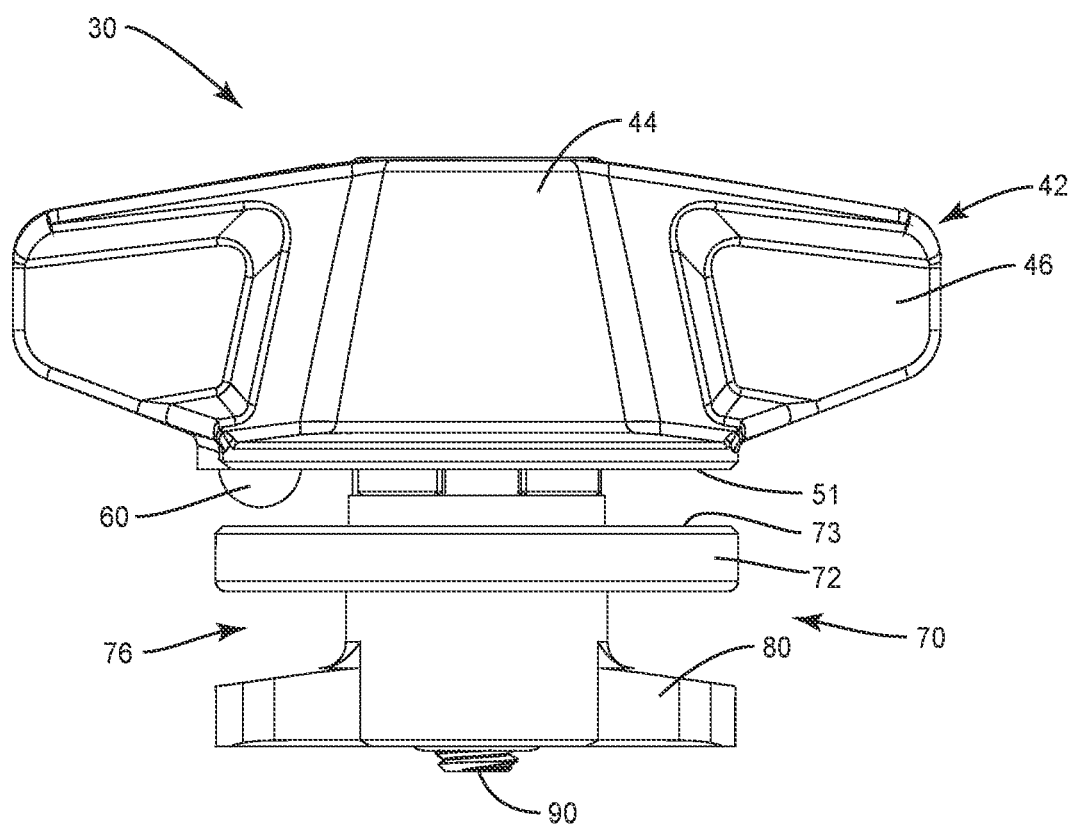
FIG. 7 shows top view of the male assembly of FIG. 6.
Figure 8:
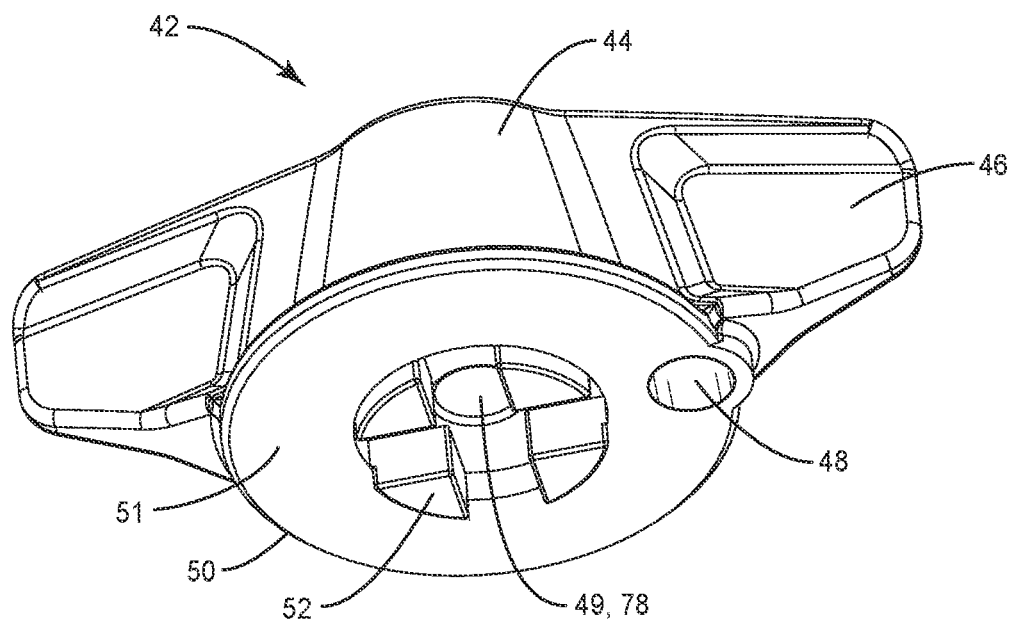
FIG. 8 shows a perspective view of the first section of the male assembly of FIG. 7.
Figure 13:
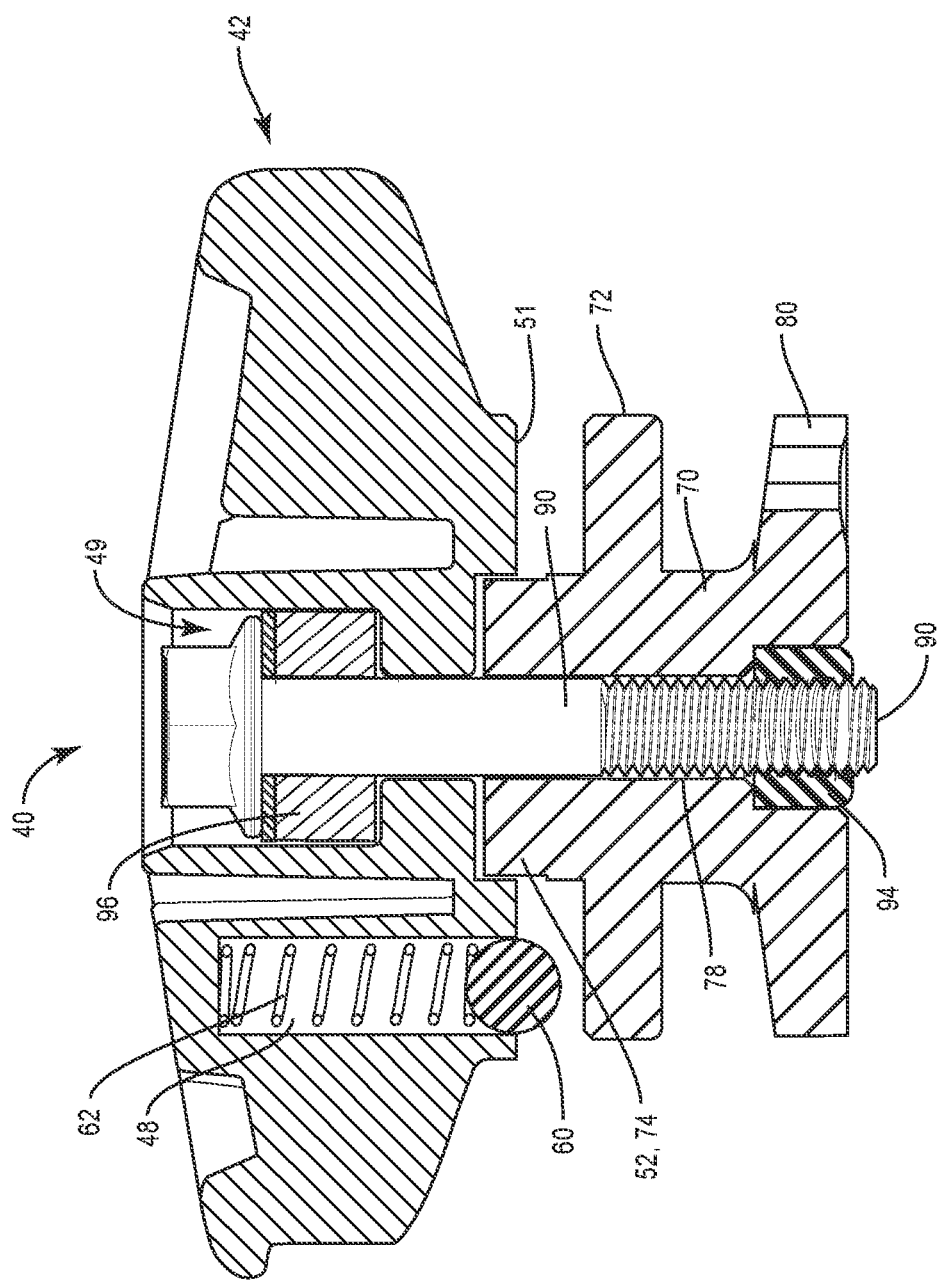
FIG. 13 shows a cross-sectional view of the male assembly of FIG. 7, with some parts omitted for clarity.

Referring to FIGS. 3-5, an exemplary locking assembly 30 is shown. The locking assembly 30 includes a male assembly 40 and a female assembly 100. The male assembly 40, shown also in FIGS. 6-7, includes a first section 42 joined to and rotationally coupled to a second section 70. For ease of reference, the direction from the first section 42 toward the second section 70 in FIGS. 6-7 will be referred to as "forward", even though this is typically rearward relative to the UTV 5 itself when the relevant windshield is a rear windshield 20. The first section 42 includes a main body (sometimes referred to herein as "knob") 44, a detent ball 60, and a spring 62. As shown in FIG. 8, the knob 44 advantageously includes one or more outwardly extending flanges 46 for gripping by a user. The knob 44 also includes an off center internal recess 48 (see FIG. 13) and a forward flange 50. The recess 48 is configured to receive the spring 62 and the detent ball 60. The forward flange 50 includes a forward face 51 that faces toward the second section 70 and is advantageously generally planar. A plurality of teeth 52 extend forward beyond the forward face 51. The knob 44 also includes an axial passage 78 that is configured to receive a mating bolt 90, as discussed further below.

Figure 9:
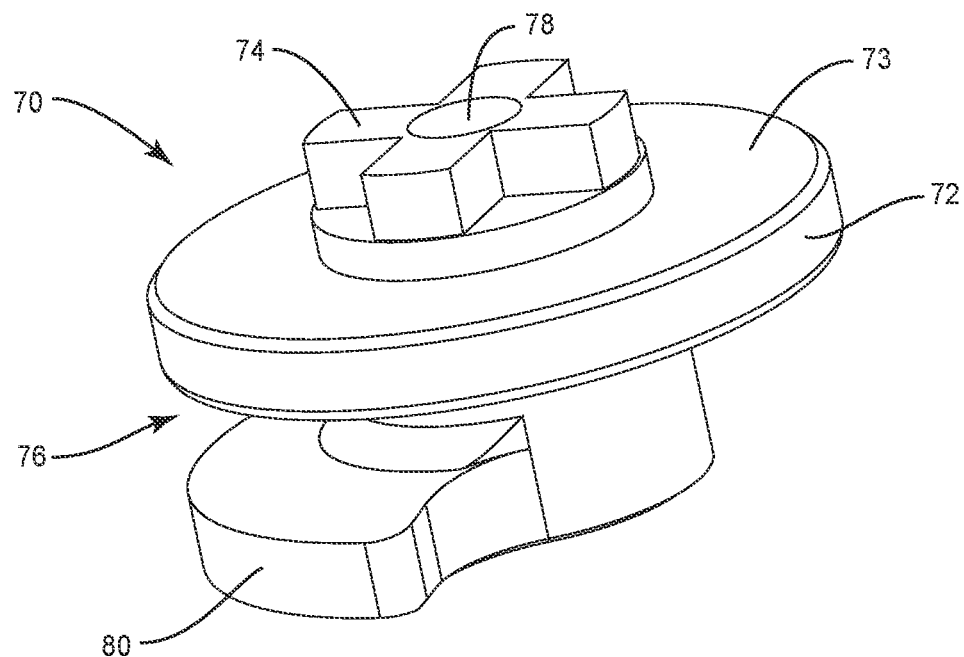
FIG. 9 shows a perspective view of the second section of the male assembly of FIG. 7.

The second section 70 includes an annular flange 72, which advantageously has a generally planar face 73 facing the first section 42. See FIG. 9. A plurality of teeth 74 extend rearward (toward the first section 42). The teeth 52, 74 of the first and second sections 42, 70 are configured to interengage so as to rotationally couple the first section 42 and the second section 70. A tab 80 is disposed forward of the flange 72, and is spaced from the flange 72 by a gap 76. The illustrated tab 80 sweeps an arc A of approximately 180°, but this is not required. The tab 80 may sweep any appropriate amount, such as 90°, 60°, etc. The angular sweep of the tab 80 need only be enough to engage with the female assembly 100 to lock the male assembly 40 to the female assembly 100, as discussed further below. The second section 70 also includes an axial passage 78 that is configured to receive the mating bolt 90, and advantageously a corresponding nut 94. The forward portion of the axial passage may advantageously be shaped to peripherally enclose the nut 94 and prevent the nut 94 from rotating relative to the second section 70. Further, the nut 90 may be of a self-locking nut type.

Figure 12:
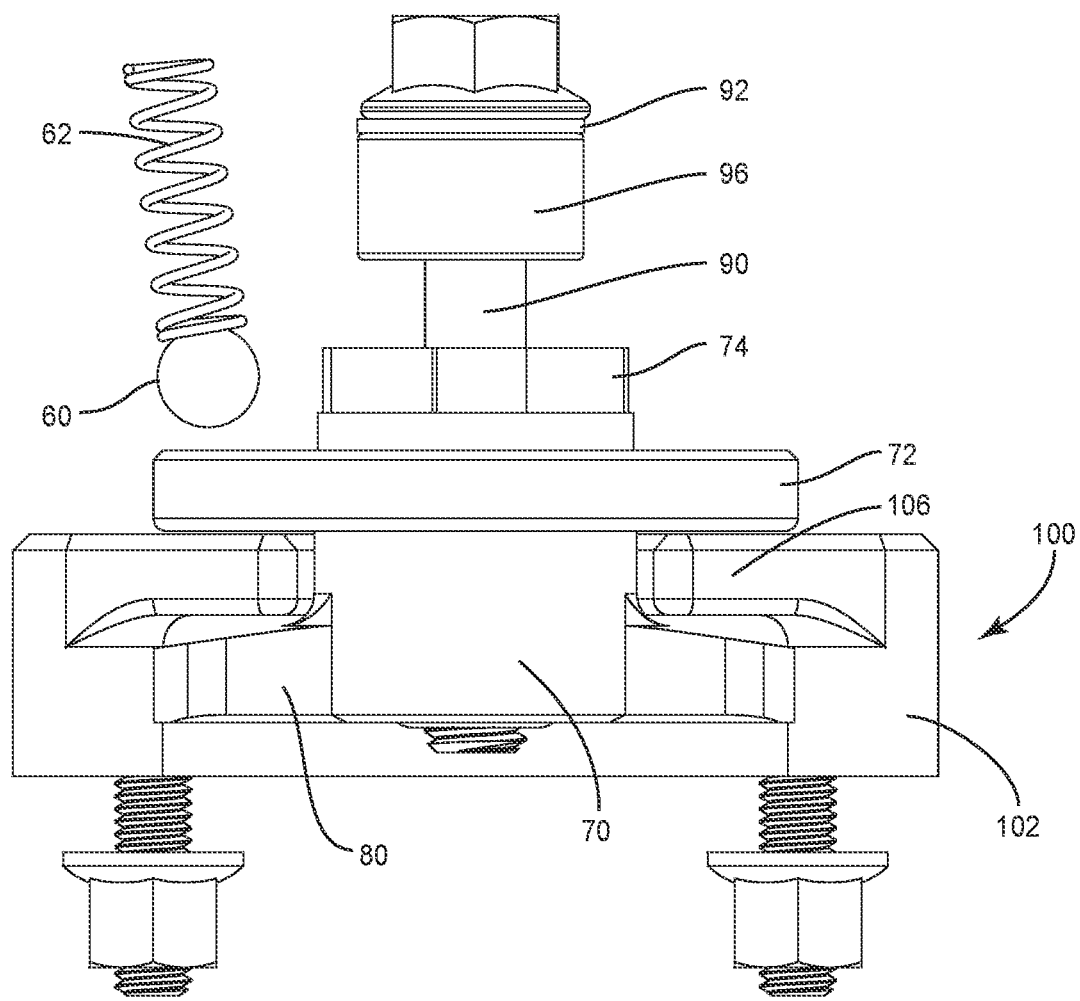
FIG. 12 shows the locking assembly of FIG. 5, with the first section of the male assembly and panels of the windshield omitted for clarity.

The mating bolt 90 longitudinally secures the first section 42 to the second section 70. An elastic element 96 is advantageously disposed about the mating bolt 90 in the axial passage 49 of the first section 42. See FIGS. 12-13. The elastic element 96 may take the form of a hollow cylinder if desired. It is intended that the elastic element 96, in some embodiments, is captured between head of the mating bolt 90 and an internal shoulder surface of the first section 42, internal to the axial passage 49. As explained further below, the elastic element 96 allows for a small amount of longitudinal movement between the first and second sections 42, 70, under bias. If desired, a washer 92 may be disposed between the head of the mating bolt 90 and the elastic element 96.

Figure 10:
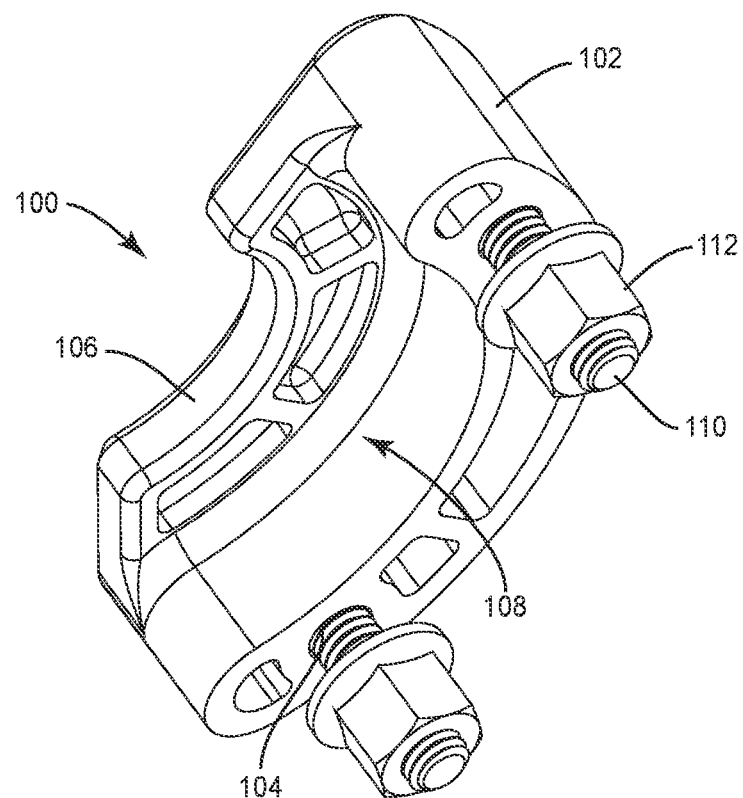
FIG. 10 shows a perspective view of the female assembly of FIG. 5.
Figure 11:
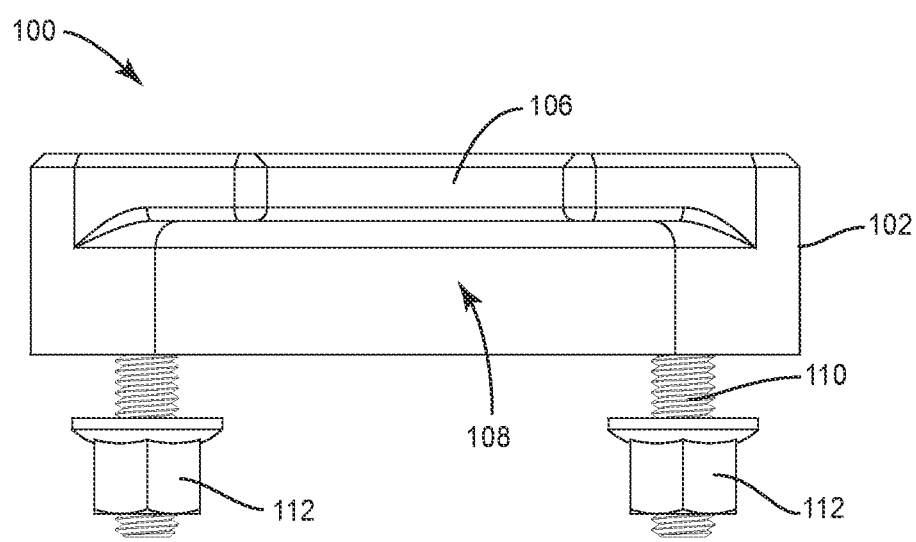
FIG. 11 shows a top view of the female male assembly of FIG. 5.

The female assembly 100, shown also in FIGS. 10-11, includes a mounting block 102 and one or more mounting screws 110. The mounting block 102 advantageously has a generally crescent shape, with an arcuate recess 108 formed therein. A collar wall 106 bounds the recess 108 on one side. The recess 108 is configured to receive the tab 80, with the collar wall 106 extending into gap 76. The mounting block 102 also includes suitable through holes 104 for the mounting screws 110. The mounting screws 110 extend through the mounting block 102 to mount the female assembly 100 to the folding/second panel 26. Suitable nuts 112 (e.g., self-lock nuts) may be used to secure the mounting screws 110 and mounting block 102 to the second panel 26.

The male assembly 40 is mounted to the first panel 22, which in an illustrative example, is the fixed portion of a folding windshield 20. A suitable hole 21 is drilled or otherwise formed in the first panel 22 for allowing the teeth 52 of the first section 42 to extend through. If only one locking assembly 30 is to be used, the hole 21 is advantageously in the laterally central section of the windshield 20 (i.e., located in the laterally middle ⅓ of the windshield). The hole 21 should be large enough to allow the first section 42 to be rotated without being stopped by the teeth 52, but small enough to allow a smaller detent hole 25 or other feature (e.g., a recess formed in the perimeter of the through hole 21) to be formed for receiving the detent ball 60. Note that there may be multiple detent hole/features 25 at different angular positions around the through hole 21 in the windshield 20, corresponding to angular positions of the male assembly 40 where detent-base retention is desired. Note further that the detent hole/features 25 may not extend entirely through the windshield 20; for example the detent holes/features 25 may be simple round recesses. The spring 62 and ball 60 are inserted in the corresponding recess 48 in the first section 42, and the first section 42 is pressed against the interior face 23 of the first panel 22 of the windshield, with the teeth 52 extending into and/or through the through hole 21, and the knob 44 on the interior side of the windshield 20. The second section 70 is then pressed against the outer face 24 of the first panel 22 of the windshield 20, with the teeth 74 extending into and/or through the through hole 21 and engaging the teeth 52 of the first section 42. The mounting bolt 90 is advantageously inserted into the through passage 78 of the first section 42, with the elastic element 96 and optional washer 92 in position, prior to mounting the second section 70 to the first section 42, so that the mounting bolt 90 may aid in aligning the first and second sections 42, 70. The mounting bolt 90 is then tightened with the aid of the nut 94 to mount the second section 70 to the first section 42, with the male assembly 40 extending through the first panel 22 of the windshield 20. Note that the second section 70 is rotationally coupled to the first section 42, but there is some longitudinal relative movement allowed between the two sections 42, 70, which varies the amount of compression of the elastic element 96. Thus, the mounting bolt 90 does not need to be tightened a specific amount, and the first and second sections 42, 70 are pressed against their respective opposing sides 23, 24 of the first panel 22 with an amount of pressure that provides light drag against rotation of the male assembly 40 that is partially controlled by the compression of the elastic element 96.

The female assembly 100 is mounted to the second panel 26 on the outer surface 28 of the second panel 26. Suitable holes are drilled or otherwise formed in the second panel 26 for the mounting screws 110. Note that the orientation and position of the female assembly 100 should be such that the tab 80 of the male assembly 40 will be able to be rotated into the recess 108 of the female assembly 100 when the second panel 26 is folded down. Advantageously, the mounting block 102 is oriented such that the recess 108 is upwardly open when the second panel 26 is folded down.

To use the locking assembly 30, the second panel 26 is folded down (rotated about hinge 29) so that the outer surface 28 of the second panel 26 is oriented toward the outer surface 24 of the first panel 22. Doing so brings the female assembly 100 into alignment with the male assembly 40. When the second panel 26 is folded down, the knob 44 is advantageously in an "unlocked" detent position such that the tab 80 is rotated out of the way of the female assembly 100. The knob 44 is then turned to rotate the tab 80 into the recess 108 on the female assembly 100. This locks the first and second panels 22, 26 together. Note that a slight interference may optionally be present between the tab 80 and the collar wall 106, which the elastic element 96 helps both compensate for and somewhat maintain. Note also that in the locked configuration, the detent ball 60 is biased by the spring 62 to engage the detent hole/features 25 of the first panel 22, which helps prevent accidental rotation of the knob 44 out of the locked position.

When desired, the second panel 26 can be rotated back to the up/deployed position by unlocking the locking assembly 30. To unlock the locking assembly 30, the knob 44 is rotated so that the tab 80 is freed from the recess 108. This action unlocks the panels 22, 26 so that the second panel 26 can be moved into the desired position. Note that the rotation of the knob 44 from the locked position to the unlocked position, and vice versa, is advantageously allowed to be clockwise or counter-clockwise at the user's discretion. That is, the knob 44 can advantageously be rotated in both directions to both lock and unlock. In addition, the detent ball 60 is biased by the spring 62 or otherwise to engage different detent hole/features 25 of the first panel 22 in the locked position and the unlocked position, which gives the user tactile feedback and helps maintain the knob 44 in the desired rotational position.

The discussion above has been in the context of a single locking assembly 30 mounted to and being used with a rear windshield 20 of a UTV 5. However, multiple locking assemblies 30 may be used if desired, such as one toward each lateral side of the windshield 20. Likewise, one or more locking assemblies 30 can be used with the front windshield 10, or any side windshields, if desired. Further, the use of the locking assembly 30 is not limited to UTV's, but may instead be used in any applications involving hinged panels, whether the panels are intended to be transparent or not.

Spatially relative terms such as "under", "below", "lower", "over", "upper", "left", "right", and the like, are used for ease of description to explain the positioning of one element relative to a second element. These terms are intended to encompass different orientations of the device in addition to different orientations than those depicted in the figures. Further, terms such as "first", "second", and the like, are also used to describe various elements, regions, sections, etc., and are also not intended to imply sequence. Thus, in some situations, the "upper" feature could be below the "lower" feature, and the "right" feature could be to the left of the "left" feature, depending on the actual orientation of the relevant piece. Thus, the directions of up, down, left, and right should be understood to be relative directions. Like terms refer to like elements throughout the description.

The present disclosure may, of course, be carried out in other ways than those specifically set forth herein without departing from essential characteristics of the disclosure. The present embodiments are to be considered in all respects as illustrative and not restrictive, and all changes coming within the meaning and equivalency range of the appended claims are intended to be embraced therein.

What is claimed is:

1. A folding panel assembly, comprising:
   a second panel rotatably mounted to a first panel by a hinge, such that the folding panel assembly is movable between a deployed configuration and a folded configuration;
   a locking assembly for holding the second panel in position relative to the first panel in the folded configuration;
   wherein the locking assembly comprises:
      a male assembly rotatably mounted to the first panel; the male assembly having a tab rotationally fixed relative to a rotatable actuator, with the tab and the actuator disposed on opposing sides of the first panel;
      a female assembly fixedly mounted to the second panel; the female assembly having a recess configured to receive the tab;
   wherein the locking assembly is rotatable between a locked position and an unlocked position, while the folding panel assembly is in the folded configuration, by rotation of the actuator; wherein:
      in the locked position, the tab extends into the recess and is captured between the female assembly and the second panel so as to hold the second panel relative to the first panel;
      in the unlocked position, the tab is outside the recess so as to allow the second panel to rotate relative to the first panel about the hinge;
   wherein rotation of the actuator causes rotation of the tab to change the locking assembly between the locked position and the unlocked position.

2. The folding panel assembly of claim 1, wherein the male assembly comprises a detent for tactilely indicating that the locking assembly is in the locked position.

3. The folding panel assembly of claim 2, wherein the detent comprises a spring biased ball that is received in a corresponding recess when the locking assembly is in the locked position.

4. The folding panel assembly of claim 1, wherein the rotatable actuator is a knob with one or more outwardly extending flanges.

5. The folding panel assembly of claim 1:
wherein the male assembly comprises a first section coupled to a second section via a fastener, the first section disposed mostly on a first side of the first panel and having the actuator, the second section disposed mostly on a second side of the first panel and having the tab;
wherein the male assembly comprises a detent for tactically tactilely indicating that the locking assembly is in the locked position.

6. The folding panel assembly of claim 5, wherein the first panel comprises a hole therethrough, and wherein the first and second sections of the male assembly extend into the hole.

7. The folding panel assembly of claim 5, wherein the male assembly comprises a compressible element disposed about the fastener and configured to allow biased and constrained longitudinal displacement of the first section relative to the second section.

8. The folding panel assembly of claim 1, wherein the recess is jointly formed by the female assembly and the second panel.

9. The folding panel assembly of claim 1, wherein the male and female assemblies are mounted to the first and second panels in laterally central sections thereof, respectively.

10. The folding panel assembly of claim 1, wherein the tab sweeps an arc of approximately 180 degrees.

11. A locking assembly for locking panels of a hinged panel assembly together, the hinged panel assembly having a second panel rotatably mounted to a first panel by a hinge, such that the hinged panel assembly is movable between a deployed configuration and a folded configuration; the locking assembly for holding the second panel in position relative to the first panel in the folded configuration and comprising:
a male assembly configured to be rotatably mounted to the first panel; the male assembly having a tab rotationally fixed relative to a rotatable actuator, with the tab and the actuator configured to be disposed on opposing sides of the first panel;
wherein the male assembly comprises a first section coupled to a second section via a fastener, the first section configured to be disposed mostly on a first side of the first panel and having the actuator, the second section configured to be disposed mostly on a second side of the first panel and having the tab;
wherein the male assembly comprises a compressible element disposed about the fastener and configured to allow constrained longitudinal displacement of the first section relative to the second section;
a female assembly configured to be fixedly mounted to the second panel; the female assembly having a recess configured to receive the tab;
wherein the locking assembly is configured to be rotatable between a locked position and an unlocked position, while the folding panel assembly is in the folded configuration, by rotation of the actuator; wherein:
in the locked position, the tab extends into the recess and is captured between the female assembly and the second panel so as to hold the second panel relative to the first panel;
in the unlocked position, the tab is outside the recess so as to allow the second panel to rotate relative to the first panel about the hinge;
wherein rotation of the actuator causes rotation of the tab to change the locking assembly between the locked position and the unlocked position.

12. The locking assembly of claim 11, wherein the male assembly comprises a detent configured to retain the locking assembly in the locked position.

13. The locking assembly of claim 12, wherein the detent comprises a spring biased ball.

14. The locking assembly of claim 11, wherein the rotatable actuator is a knob with one or more outwardly extending flanges.

15. The locking assembly of claim 11:
wherein the locking assembly further comprises a nut configured to engage the fastener;
wherein the second section includes an axial passage; wherein the axial passage is configured to receive and peripherally enclose the nut so as to prevent the nut from rotating relative to the second section.

16. The locking assembly of claim 11, wherein the first and second sections of the male assembly are configured to partially overlap when coupled together by the fastener.

17. The locking assembly of claim 11, wherein the first section and the second section each comprise a plurality of teeth; wherein the plurality of teeth of the first section inter-engage with the plurality of teeth of the second section to rotationally couple the first section to the second section.

18. The locking assembly of claim 11, wherein the recess is arcuate.

19. The locking assembly of claim 11, wherein the male and female assemblies are formed of plastic.

20. The locking assembly of claim 11, wherein the tab sweeps an arc of approximately 180 degrees.

* * * * *